Nov. 8, 1960 H. D. CANAZZI 2,959,148
WATER BRAKE FOR OUTBOARD MOTORS AND STERN DRIVES
Filed Dec. 12, 1957 3 Sheets-Sheet 1

INVENTOR.
*Henry Donald Canazzi,*
BY
*Raymon E. Rousseau.*
ATTORNEY.

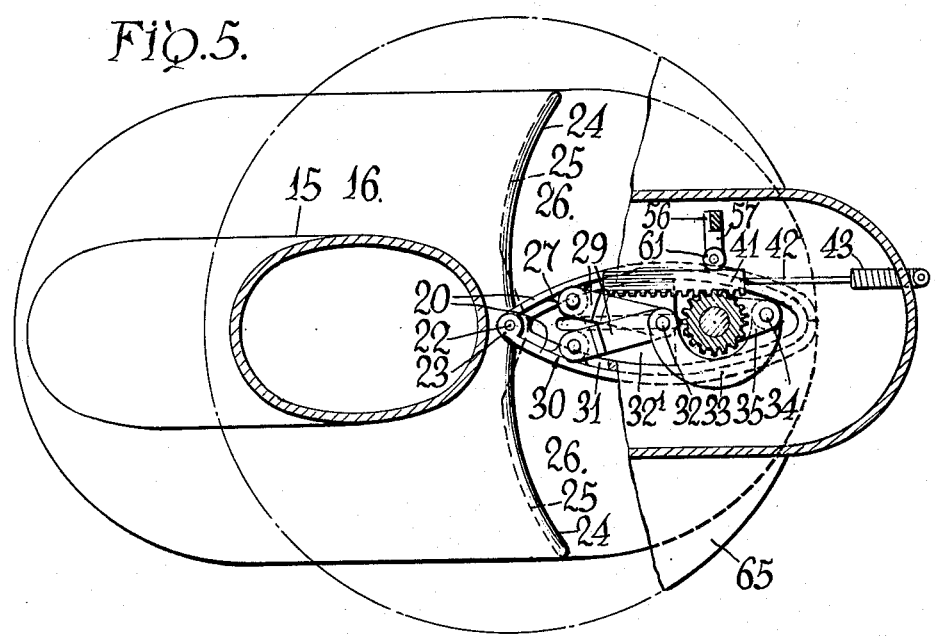
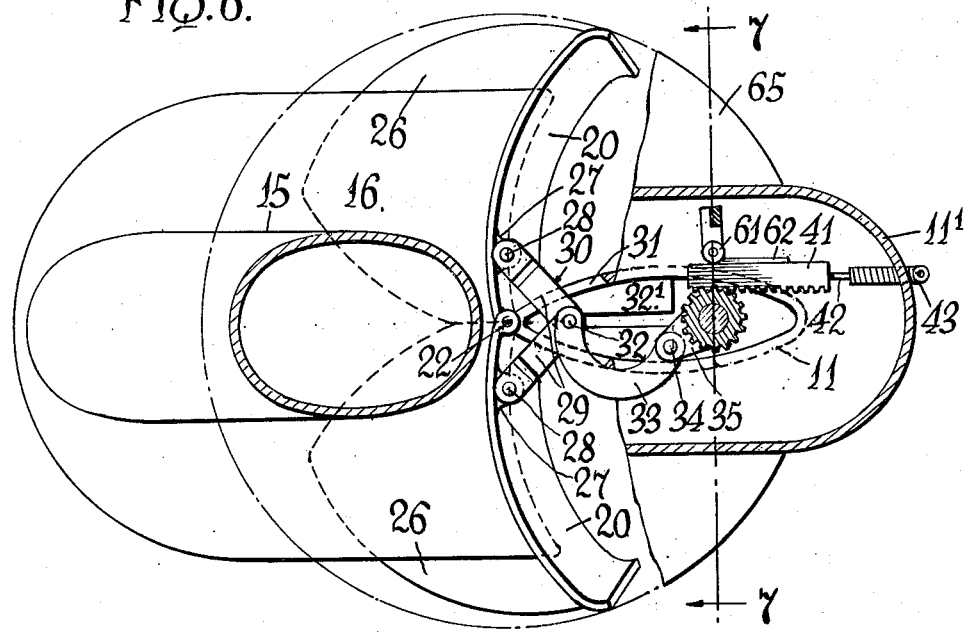

Nov. 8, 1960  H. D. CANAZZI  2,959,148
WATER BRAKE FOR OUTBOARD MOTORS AND STERN DRIVES
Filed Dec. 12, 1957  3 Sheets-Sheet 3
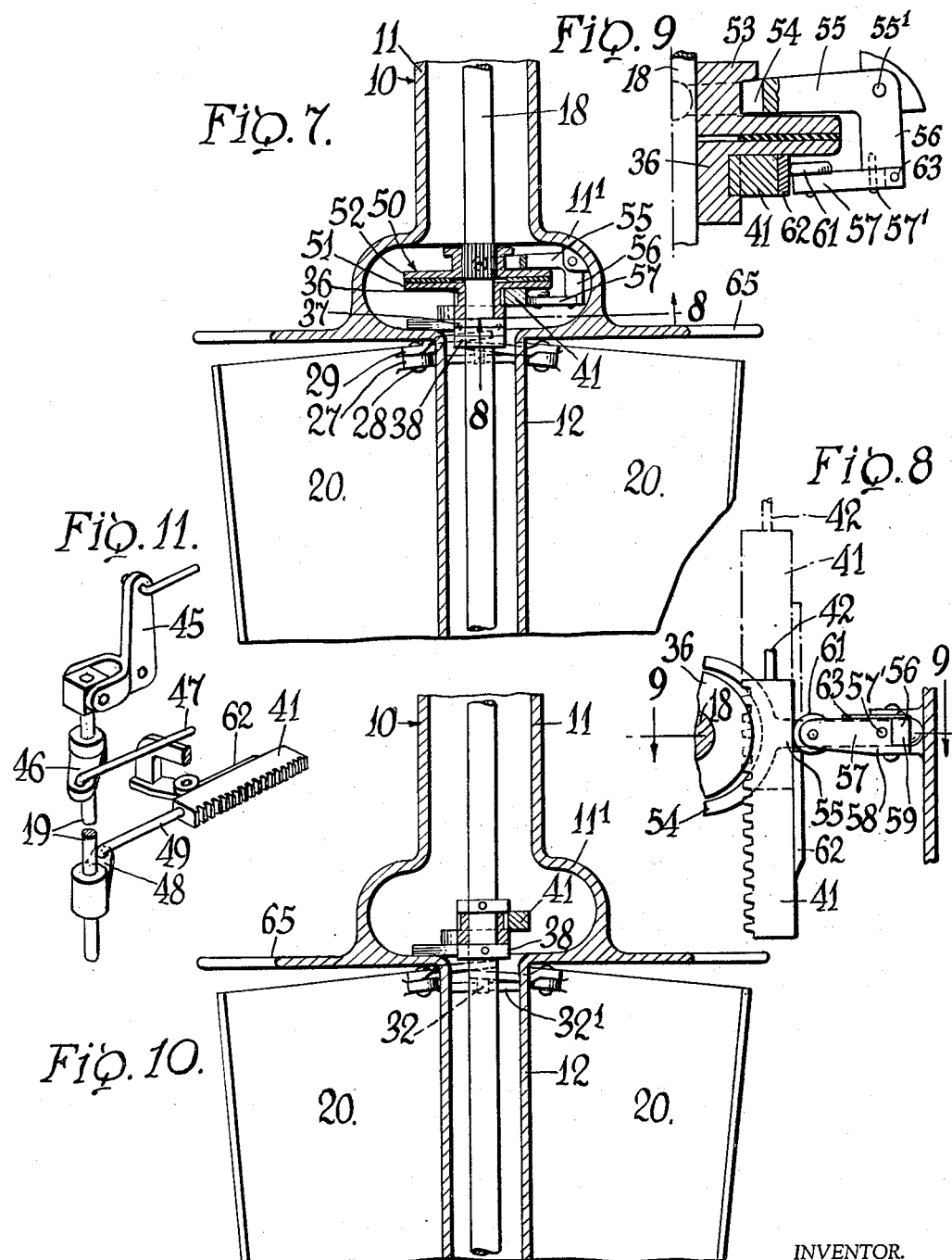

United States Patent Office 2,959,148
Patented Nov. 8, 1960

2,959,148
WATER BRAKE FOR OUTBOARD MOTORS AND STERN DRIVES

Henry Donald Canazzi, 178 Jewitt Parkway, Buffalo, N.Y.

Filed Dec. 12, 1957, Ser. No. 702,339

14 Claims. (Cl. 115—17)

My invention relates to brakes for boats and more particularly to brakes for outboard motors and stern drives for boats.

The top speed of such boats, due to improvements in hull design and especially due to the availability and use of more powerful motors, is steadily increasing. Because still more powerful motors are to be made available soon it appears certain that the top speed of such boats will be further increased.

One disturbing result of the higher speeds of such boats is the marked increase in the occurrence of accidents, especially more serious accidents, and since it is obvious that many accidents which occur at high speeds might be avoided at slower speeds there is a definite need for a means to quickly reduce the high speed of such boats to slower and safer speeds.

Therefore the objects of my invention are to provide certain parts of the drive means for such boats with simple, effective and readily operable brake means operable to engage the water in a manner to quickly reduce the higher speeds of a boat driven by the drive means to slower and safer speeds; to provide a brake means which requires a minimum of redesigning of the underwater and adjacent parts of the boat drive means; to provide a brake means formed and carried by the drive means in a non-braking position so as to not materially reduce the potential top speed of the boat and operable to a braking position to quickly reduce the speed of the boat; to provide a brake means with a simple and effective operating mechanism operable to lock the brake means in a non-braking position; to provide brake means formed and arranged to utilize the force of water thereagainst in cooperation with the locking effect in holding the brake means in the non-braking position and to utilize said force to supplement the action of a control mechanism in quickly moving the brake means to the braking position; to provide a brake means adapted to be operated from a place within the boat; and to provide a brake means with a clutch operable by a control means to engage a power driven part of the drive means, thereby to utilize the power of the driven part in assisting the control means to overcome the force of water acting against brake plates during movement of said plates from a braking to a non-braking position.

In the drawings:

Figure 5 is an enlarged horizontal sectional view taken about on the line 5—5 of Figure 1 and showing the braking means in a non-braking position.

Figure 6 is an enlarged horizontal sectional view taken in the plane of Figure 5 and showing the braking means in a braking position.

Figure 7 is a fragmentary vertical sectional view taken about on the line 7—7 of Figure 6.

Figure 8 is a fragmentary horizontal sectional view taken about on the line 8—8 of Figure 7 looking in the direction of the arrows.

Figure 9 is a vertical sectional view taken about in the plane of line 9—9.

Figure 10 is a fragmentary vertical sectional view taken in the plane of Figure 7 but showing a simplified form of brake operating mechanism.

Figure 11 is a fragmentary perspective view showing a modified form of control mechanism for the brake means.

Figure 1:
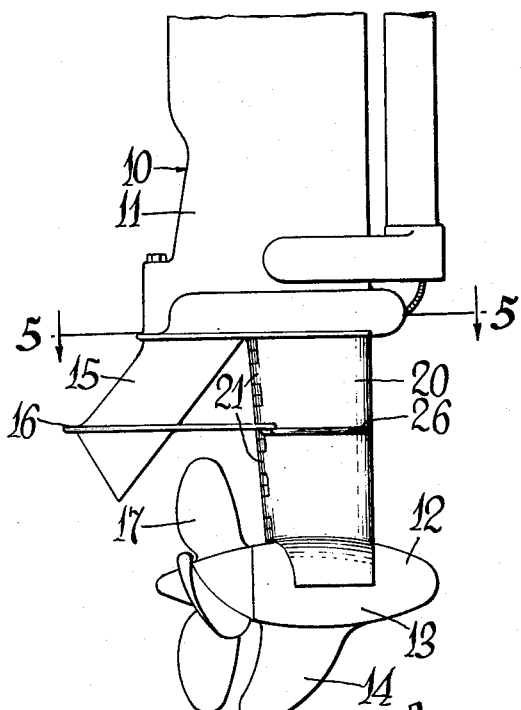
Figure 1 is a fragmentary side elevational view of an outboard motor provided with an underwater braking means constructed in accordance with the principles of the present invention.
Figure 2:
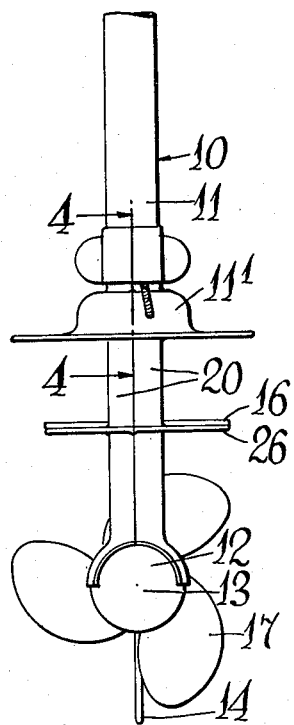
Figure 2 is a front elevational view of Figure 1.
Figure 3:
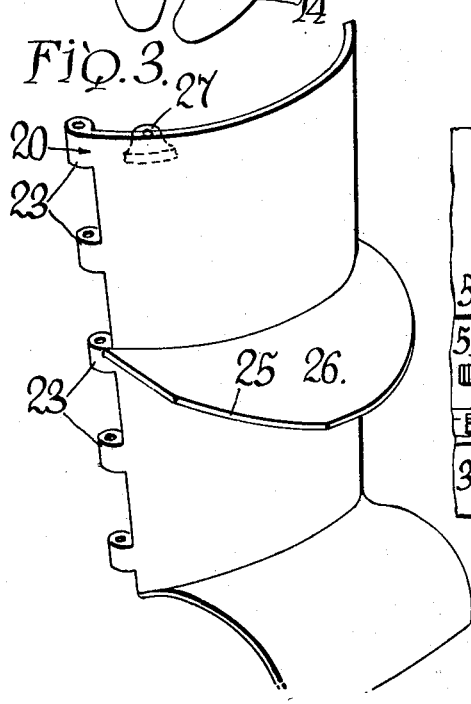
Figure 3 is a perspective view showing one of the brakes of Figure 1 removed from the motor.
Figure 4:
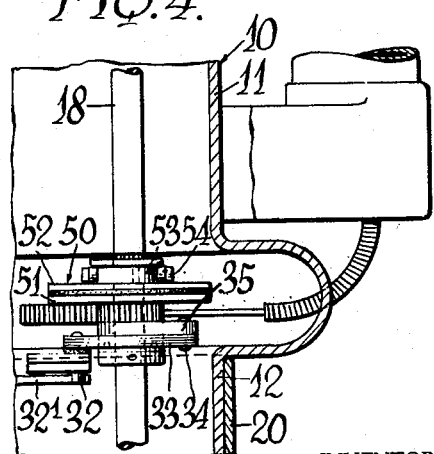
Figure 4 is an enlarged fragmentary vertical sectional view taken about on the line 4—4 of Figure 2.

My invention has been shown in combination with the underwater and adjacent parts of an internal combustion type of outboard motor, but it will be apparent to those skilled in the art that my invention may be as readily adapted to other types of outboard motors and for use in combination with stern drives.

Referring now to the drawings, the numeral 10 generally designates the lower part of an outboard motor which includes an upper housing 11 from the lower end of which a lower housing 12, having its lower end formed with an enlarged gear housing 13 and a skeg 14 depends.

As is usual in such motors an underwater exhaust 15 extends rearwardly and downwardly from the upper housing 11 and through and below a cavitation plate 16 carried by the exhaust 15 and by the rear end of the housing 12, and a propeller 17 is operably mounted at the rear end of the gear housing 13 to drive the unit. The lower housing 12 and the gear housing 13 as shown in Figures 1 and 5 are of a streamlined form to reduce their resistance to movement through water.

A drive shaft 18 extends through the housings 11 and 12 and into the gear housing 13 and is provided with a gear of a reversible gear set (not shown) which is operable by a shifting rod 19 (Figure 10) to reverse the direction of rotation of the propeller 17 and the direction of movement of the unit through water all in a well known manner. The rear edge of the housing 12 is slightly inclined in a downward and forward direction for a purpose to be described later.

In order to provide a simple and effective brake means a pair of complementary brake plates 20 are shaped to conform to and snugly embrace the surface of the housing 12 and the surface of the upper portion of the gear housing 13 so as to not materially increase the resistance of such housings to movement through water. The rear inclined edge of the housing 12 is formed with spaced hinge eyes 21 provided with a hinge pin 22 upon which the hinge eyes 23 formed along the rear edge of the plates 20 are pivotally secured so that the plates 20 may each be readily swung outwardly from a non-braking position in which they embrace the housing 12 as shown in Figure 5 to the laterally extending braking position shown in Figure 6.

A reference to Figures 1 and 5 shows how the cavitation plate 16 is shaped, extends forwardly and terminates adjacent the transverse plane of one of the hinge eyes 23 so that its forward marginal edge portion 24 normally overlies a rear marginal edge portion 25 of a cavitation plate 26 carried by each plate 20.

By thus forming and locating the cavitation plates 16 and 26, the latter form substantially continuous forward offset extensions of the former when the brake plates are in their non-braking position and readily swing beneath the plate 16 when the plates 20 are swung to their braking position. It will be noted that the rear edges of the cavitation plate 26 are formed to allow the desired opening movement of the plates 20 and that the forward edges of the cavitation plate 16 are formed to receive the curved sides of the brake plates 20 when they are in their braking position so that further opening movement of the brake plates is prevented.

The brake plates 20 are relatively thin but because of their curvature and the reinforcing provided by the plates 26 they will withstand considerable pressure of water thereagainst.

To provide a presently preferred form of brake means generally indicated by the numeral 30 the inner top side of each plate 20 is formed with a lug or ear 27 each of which is pivotally secured as at 28 to one end of one of a pair of links 29 which pass through suitable openings 31 formed in the section 12 and which have their opposite ends pivotally secured by a pivot pin 32 to one end of a semi-circular shaped link 33 having its opposite end pivotally connected as at 34 to the outer end of a lever arm 35.

To insure equal movement of the links 29 and the plates 20 the pivot pin 32 is simply extended downwardly and slidably engaged in a slot of a web 32' formed in the housing 12 as best seen in Figures 5, 6 and 7.

The inner end of the lever arm 35 is formed with an enlarged boss 36 which is freely journaled on the drive shaft 18 and, to resist the thrust of a clutch 50, to be hereinafter described, is preferably supported upon a thrust bearing 37 slipped over the shaft 18 and retained in place by a stop collar 38 rigidly secured to the shaft by any suitable means.

As viewed in Figures 5 and 6 the shaft 18 is driven in a counterclockwise direction and while its rotation normally does not effect any movement of parts of the brake means 30 I prefer to utilize the rotative force of the shaft 18 to assist a control mechanism in overcoming the considerable force of the water against the brake plates when they are being moved to their non-braking position.

The shape of the plates 20 is such that when they are moved forwardly through water while in their non-braking position the water tends to hold them in said position; however, to insure them against adventitious movement, the brake means 30 is formed to positively lock and hold them in their non-braking position. This positive locking effect is accomplished by simply designing the semi-circular link 33 so that its pivotal connection 34 may be swung counterclockwise by the arm 35 a sufficient distance beyond a plane intersecting the alined axes of the hinge pin 22, the pivot 32 and the shaft 18 to effectively lock the linkage and the brake plates against undesired movement from the position shown in Figure 5. It will be understood that during a clockwise movement of the lever 35 the plates 20 will be swung outwardly into the water and that, due to the action of the water thereagainst, unless they are restrained, they will quickly assume the braking position shown in Figure 6. When the plates are positioned for braking they prevent a smooth uninterrupted flow of water past the unit and thereby act as water brakes which have sufficient area to quickly reduce the forward speed of a boat driven by my unit.

To accomplish the desired movement of the linkage and the brake plates the boss 36 is formed with gear teeth which are meshed with the teeth of a short rack section 41 slidably secured in an enlargement 11' at the lower end of the housing 11. The rack is moved by being connected to one end of the movable wire 42 of a Bowden cable 43 and the other end of the wire 42 is operably connected to a suitable operating lever (not shown) but located at a convenient place in the boat.

An alternate form of rack actuating mechanism is shown in Figure 10. In this form the connection of the usual gear shifting bell crank lever 45 to the gear shifting rod 19 is modified to allow rotation of the rod by a lever arm 46 slidably secured thereon and operable by a control member 47. This rotation of the rod 19 causes the same movement of a like lever arm 48 which is slidably secured thereon and which is connected by a member 49 to the rack 41 to impart the desired movement thereto.

The clutch 50 referred to above preferably includes a clutch plate 51 rigidly secured to or formed integral with the boss 36 and a friction material faced clutch plate 52 normally spaced from the plate 51. The plate 52 is formed with an integral boss 53 which is circumferentially grooved for engagement with a shifting fork arm portion 54 of a bell crank lever 55 pivotally secured as at 55' to the housing 11 and the other depending arm 56 of the lever 55, as shown in Figures 7 and 8, has its lower end pivotally connected to one end of a lever arm 57 as at 57'. The one end of the arm 57 is formed with a stop 58 which, when the arm is swung in a counterclockwise crank direction as viewed in Figure 8, abuts a projection 59 thereby limiting swinging movement of the arm in one direction and positioning it so that a small wheel 61 normally rides against the rack 41. The rack 41 is provided with a cam surface 62 shaped as shown in Figure 8 and it will be seen that during movement of the rack 41 from its full line position to its broken line position shown in this figure the square end of the cam surface 62 engages and moves the roller 61 and thereby causes the arm 57 to swing from its normal position about its pivotal connection 57' in the direction of the arrow so as to allow the cam surface 62 to pass beneath the roller 61 and so as to not move the bell crank lever 55 about its pivot 55'. It will also be seen that during return movement of the rack from its broken line position to its full line position the tapered end of the cam surface 62 is forced against and beneath the roller 61 and since the arm 57 cannot swing about its pivot 57' because its stop 58 is engaged with the projection 59, the cam forces it away from the rack and thereby causes sufficient swinging movement of the bell crank lever 55 about its pivot 55' to drivingly engage the clutch plate 51, whereby the power of the shaft 18 is utilized to assist the operating mechanism in restoring the brake plates to their non-braking position, a flat spring 63, being arranged as shown in Figure 8, resiliently holds the arm 57 in its normal position.

Low power drive units may not require the use of the clutch mechanism above described and in this event the simplified mechanism of Figure 9 which does not include clutch means may be used.

The purpose of inclining the rear edge of the housing 12 is to provide an inclined hinge connection for the brake plates which when moved to their braking position are inclined upwardly and rearwardly sufficient to cause water acting thereagainst to exert a downward force on the brake plates tending to force the drive unit and the boat downwardly, whereby a better braking action and control of the boat is attained. A circular plate 65 carried by the lower end of the section 11 is slightly spaced above the top edge of the brake plates 20 and, being of a size to overlie the brake plates in their braking position, serves to substantially block the flow of water over the top edge of the brake plates, thereby considerably increasing the braking effect of the brake plates.

It should be understood that the herein shown and described forms of my invention are intended to exemplify its principles and that various modifications, rearrangements and combinations of the component parts may be made within the scope of the appended claims.

I claim:

1. The combination of an outboard power drive means for boats with a brake means operable to impede the flow of water around underwater portions of the drive means, thereby to reduce forward speed of the boat comprising a brake plate formed to normally embrace under water portions of the drive means and to allow unimpeded forward motion of said portions through water; a pivotal connection between said underwater portions of the drive means and the brake plate to allow swinging motion of the brake plate between a normal non-braking and a braking position, wherein the brake plate is located to impede the flow of water around the drive means, thereby to reduce the forward speed of the boat; a brake plate operating means encased by the drive means and operably connected to the brake plate, said means including a part pivotally connected thereto and rotatably secured upon a drive part of the drive means for independent relation thereon, and a control means for said plate operating means encased by the drive means and engaged with the rotatably secured part, whereby movement of the control means rotates the rotatably secured part, thereby actuating the brake plate operating means to cause the brake plate to move between its non-braking and braking positions.

2. The combination set forth in claim 1 wherein the brake plate operating means comprises a linkage including one link pivotally connected to the brake plate, a second link pivotally connecting the one link and to the rotatably secured part for movement thereby, said second link being formed to allow swinging of its pivotal connection to the rotatably secured part sufficiently around the axis of rotation of said part to hold and lock the linkage against undesired movement, thereby holding and locking the brake plate in its non-braking position.

3. The combination set forth in claim 2 wherein the rotatably secured part is freely journaled on a power driven element of the drive means, a first clutch member is secured to said part, a second companion clutch member, normally spaced from and in alined relation to the first clutch member, is slidably secured upon and driven by the driven element, and the control means includes mechanism for moving the second clutch member into driving engagement with the first clutch member, whereby the power of the driven element is utilized to actuate the brake operating means in moving the brake plate.

4. The combination set forth in claim 3 wherein the brake plate is pivoted to be moved to its non-braking position against the flow of water, the second link and the rotatably secured port are arranged to swing in the direction of rotation of the driven element, whereby when the clutch is engaged the power of the driven element is utilized to overcome the force of water against the brake plate and to move the plate to its non-braking position.

5. The combination set forth in claim 4 wherein, during movement of the control means to move the brake plate to its non-braking position, the clutch mechanism is actuated by a cam part carried by the control means to engage the clutch member and during movement of the control means to move the brake plate to its braking position the clutch engaging mechanism is inoperative.

6. The combination of an outboard power drive means for boats with a brake means operable to impede the flow of water around the streamlined underwater portions of the drive means, thereby to reduce forward speed of the boat, comprising a pair of complementary brake plates shaped to closely embrace said underwater portions and to allow unimpeded forward motion of said embraced portions through water, a pivotal connection between the trailing edge of said underwater portion and the brake plates formed to allow outward and rearward swinging motion of the brake plates from a non-braking position embracing said portions to a laterally extending braking position, wherein the brake plates impede the flow of water around the drive means and thereby reduce the forward speed of the boat; a brake plate operating means encased by the drive means and operably connected to the brake plates, said means including a part pivotally connected thereto and rotatably secured upon a drive element of the drive means, and a control means for said plate operating means encased by the drive means and engaged with the rotatably secured part, whereby movement of the control means rotates said part and thereby actuates the brake plate operating means to cause the brake plates to move between their non-braking and braking positions.

7. The combination set forth in claim 6 wherein the pivotal connection is upwardly and rearwardly inclined whereby the brake plates when in their braking position are similarly inclined and cause water acting thereagainst to exert a downward force on the drive means, thereby improving the braking effect.

8. The combination set forth in claim 6 wherein a cavitation plate carried by the drive means terminates in the transverse plane of the inclined pivotal connection and the brake plates carry plates formed and arranged to provide substantially coplanar forward extensions of said cavitation plates when the brake plates are in their non-braking position.

9. The combination set forth in claim 6 wherein the drive means above the brake plates carries a plate formed and arranged to overlie the brake plates in their non-braking and braking positions, thereby to resist upward flow of water over the top edges of the brake plates in their braking position and thereby improving the braking effect of the brake plates.

10. The combination set forth in claim 6 wherein the brake plates each carry an outward and downward extension each formed to closely embrace the upper portion of a gear housing portion of the drive means when the plates are in their non-braking position, said extensions serving to increase the effective braking area of the brake plates in their braking position.

11. The combination set forth in claim 6 wherein the brake operating means comprises a linkage including a pair of links each having one end pivotally connected to one of the brake plates, a pin pivotally connecting the opposite ends of the links together, a lever rigidly secured to the rotatably secured part, and a link member pivotally connected to the pin and to the lever, said link member being formed to allow swinging movement of its pivotal connection to the lever sufficiently beyond a plane intersecting the pin and the pivotal connection of the brake plates, to hold and lock said linkage against undesired movement, thereby holding and locking said brake plates in their non-braking position.

12. The combination set forth in claim 11 wherein movement of the pin is restricted to a plane intersecting the pivotal connection of the brake plates to the drive means and the pivotal mounting of the lever, thereby to cause equal movement of the brake plates by the brake operating means.

13. The combination set forth in claim 11 wherein a first clutch member is rigidly secured to the rotatably secured part concentric with its axis of rotation, a second companion clutch member, normally spaced from and in axially alined relation to the first clutch member is slidably secured upon and driven by the driven element, and the control means includes mechanism inactive during movement in one direction and operable by and during movement in the opposite direction to move the second clutch member into driving engagement with the first clutch member, thereby to utilize the power of the driven element to overcome the force of the water against the brake plates during their movement to their non-braking position.

14. The combination set forth in claim 6, wherein the control means includes an element extendable to a point remote from the drive means whereby movements of the braking plates between their non-braking and braking position are controllable from said remote point.

References Cited in the file of this patent

UNITED STATES PATENTS

| | | |
|---|---|---|
| 1,526,239 | Rylander | Feb. 10, 1925 |
| 2,230,958 | Langdon | Feb. 4, 1941 |
| 2,232,911 | Gurr | Feb. 25, 1947 |
| 2,426,805 | Whiting | Sept. 2, 1947 |